US010640302B2

(12) United States Patent
German et al.

(10) Patent No.: US 10,640,302 B2
(45) Date of Patent: May 5, 2020

(54) ARTICLE SORTER WITH ACTIVE DISCHARGE

(71) Applicant: Dematic Corp., Grand Rapids, MI (US)

(72) Inventors: Harry Thad German, Belding, MI (US); William P. Bray, Spring Lake, MI (US); Benjamin J. Hekman, Holland, MI (US)

(73) Assignee: Dematic Corp., Grand Rapids, MI (US)

( * ) Notice: Subject to any disclaimer, the term of this patent is extended or adjusted under 35 U.S.C. 154(b) by 15 days.

(21) Appl. No.: 16/043,611

(22) Filed: Jul. 24, 2018

(65) Prior Publication Data

US 2019/0031450 A1 Jan. 31, 2019

Related U.S. Application Data

(60) Provisional application No. 62/539,175, filed on Jul. 31, 2017.

(51) Int. Cl.
| B65G 47/71 | (2006.01) |
| B65G 47/68 | (2006.01) |
| B65G 47/84 | (2006.01) |
| B65G 47/244 | (2006.01) |

(52) U.S. Cl.
CPC ........... B65G 47/71 (2013.01); B65G 47/244 (2013.01); B65G 47/681 (2013.01); B65G 47/844 (2013.01)

(58) Field of Classification Search
CPC ..... B65G 47/71; B65G 47/681; B65G 47/682
USPC ......... 198/370.02, 370.03, 370.07, 412, 413, 198/415, 617, 890, 890.1
See application file for complete search history.

(56) References Cited

U.S. PATENT DOCUMENTS

| 3,361,247 A | | 1/1968 | Lauzon | |
| 4,122,938 A | * | 10/1978 | Walz | B65B 23/12 198/411 |
| 4,462,516 A | * | 7/1984 | Guerzoni | B65G 47/71 198/367 |
| 4,911,281 A | * | 3/1990 | Jenkner | B07C 5/14 198/364 |
| 5,127,510 A | * | 7/1992 | Cotter | B65G 47/844 198/370.02 |
| 5,323,912 A | * | 6/1994 | Fan | B07C 5/362 198/437 |
| 5,396,980 A | * | 3/1995 | Sobrero | B65B 35/44 198/433 |
| 5,588,520 A | * | 12/1996 | Affaticati | B61B 13/08 198/370.06 |

(Continued)

OTHER PUBLICATIONS

International Search Report and Written Opinion of the International Searching Authority from corresponding Patent Cooperation Treaty (PCT) Application No. PCT/IB2018/55515, indicated completed on Oct. 31, 2018.

*Primary Examiner* — Joseph A Dillon, Jr.
(74) *Attorney, Agent, or Firm* — Gardner, Linn, Burkhart & Ondersma LLP

(57) ABSTRACT

An article sortation system and method of sorting articles includes an article sorter having an article support surface moving in a longitudinal direction and a plurality of discharge conveyors extending from the article support surface. The sorter is adapted to discharge articles from the article support surface to said discharge conveyors. One or more of the discharge conveyors includes an active aligner having a driven surface that is adapted to reorient at least some of the diverted articles.

10 Claims, 2 Drawing Sheets

(56) References Cited

U.S. PATENT DOCUMENTS

| | | | | |
|---|---|---|---|---|
| 5,701,989 | A * | 12/1997 | Boone | B65G 47/682 198/443 |
| 5,887,699 | A * | 3/1999 | Tharpe | B07C 3/065 198/367 |
| 6,041,909 | A | 3/2000 | Shearer, Jr. | |
| 6,220,427 | B1 * | 4/2001 | Ratz | B65G 47/642 198/369.5 |
| 6,401,936 | B1 | 6/2002 | Isaacs et al. | |
| 6,412,621 | B1 * | 7/2002 | De Vree | B65G 37/02 198/347.4 |
| 6,866,136 | B2 * | 3/2005 | Veit | B07C 5/362 198/370.02 |
| 6,923,308 | B2 | 8/2005 | Veit | |
| 7,040,478 | B2 * | 5/2006 | Ehlert | B65G 13/10 198/369.4 |
| 7,117,988 | B2 | 10/2006 | Veit et al. | |
| 7,165,918 | B2 * | 1/2007 | Kruse | B65H 29/52 406/93 |
| 7,383,936 | B2 * | 6/2008 | Enomoto | B65G 47/844 198/370.02 |
| 7,909,155 | B2 * | 3/2011 | Lupton | B65G 43/08 198/357 |
| 7,975,829 | B2 * | 7/2011 | Rogers | B65G 47/22 198/370.07 |
| 8,167,119 | B2 * | 5/2012 | Wargo | B65G 47/54 198/779 |
| 8,205,738 | B1 | 6/2012 | Fourney | |
| 8,469,178 | B2 * | 6/2013 | Butler | B65G 47/766 198/457.06 |
| 8,820,520 | B2 * | 9/2014 | Triesenberg | B65G 17/42 198/845 |
| 9,038,810 | B2 | 5/2015 | Schroader | |
| 9,533,836 | B2 | 1/2017 | Cristoforetti | |
| 2002/0063037 | A1 * | 5/2002 | Bruun | B65G 37/02 198/370.01 |
| 2005/0072656 | A1 | 4/2005 | Costanzo | |
| 2005/0109588 | A1 * | 5/2005 | Gariglio | B65G 15/58 198/817 |
| 2006/0070855 | A1 * | 4/2006 | Lemm | B65G 47/766 198/779 |
| 2007/0221471 | A1 | 9/2007 | Fourney et al. | |
| 2008/0142337 | A1 * | 6/2008 | Mouette | B65G 47/2445 198/394 |
| 2013/0327612 | A1 * | 12/2013 | Gut | B07C 5/3408 198/370.02 |
| 2015/0122613 | A1 | 5/2015 | Grant et al. | |
| 2017/0312789 | A1 | 11/2017 | Schroader | |
| 2019/0315575 | A1 * | 10/2019 | Middelberg | B65G 47/71 |

* cited by examiner

ARTICLE SORTER WITH ACTIVE DISCHARGE

CROSS REFERENCE TO RELATED APPLICATIONS

This application claims priority from U.S. patent application Ser. No. 62/539,175, filed on Jul. 31, 2017, the disclosure of which is hereby incorporated herein by reference in its entirety.

BACKGROUND OF THE INVENTION

The present invention is directed to an article sortation system and method of sorting articles, and in particular for sortation of articles, at least some of which are flexible bags such as polybags and jiffy bags. The present invention utilizes active discharge which means a driven conveyor rather than a passive conveyor or chute.

A jiffy bag is a term of art that represents a shipping envelope for one or more items, the envelope having a flexible outer layer and an inner padded layer. A polybag is also a term of art that represents a shipping envelope made up of a flexible polymeric material. Both jiffy bags and polybags are popular in order fulfillment, particularly in the e-commerce field, because they do not add significant weight or volume to the weight or volume of the item shipped, are durable, and usually self-closing. However, they are non-rigid in shape, thus making them difficult to handle in automated material-handling systems, in general. Both jiffy bags and polybags will be referred to as flexible bags.

Flexible bags are difficult to handle with automated material handling equipment which has been developed for handling rigid corrugated containers and totes. While certain types of automated article sorters, such as positive displacement shoe sorters and cross-belt sorters are good at handling flexible bags, the flexible bags are difficult to handle once discharged from the article support surface of the sorter.

SUMMARY OF THE INVENTION

Sorters have been developed with powered or gravity discharge conveyors, also known as take-away conveyors, that are at a diagonal from the travel of the sorter in order to absorb the forward motion of the article. The discharge conveyors may include a turned section in order to direct the take-away conveyor toward a path more perpendicular to the sorter. Flexible bags are not easily handled by such conventional discharge conveyors. As a result, it is common to discharge articles including flexible bags in the mix to gravity chutes which are then discharged to a bin. Conventional discharge systems are further difficult when long articles (having one dimension substantially longer than the other dimension) are included in the article mix because the long articles can get jammed at any turned sections of the take-away conveyor. Also, the diagonal orientation of the take-away conveyor dictates the spacing between the take-away conveyors which are typically at 10 foot centers or similar spacing.

The present invention is directed to an article sortation system and method of sorting articles that is capable of handling flexible bags throughout the handling equipment in a manner that does not damage the flexible bags or cause jams with the bags. Also, the present invention is capable of handling long articles in a manner that aligns elongated bags with the axis of elongation of the take-away conveyor and, therefore, does not require avoiding turns in the take-away conveyor. Thus, not only is the potential jam-point of the turn obviated, but the discharge conveyors can be at roughly a right angle to the sorter. This allows the take-away conveyors to be spaced closer together even up to half the spacing of conventional systems. The closer that discharge conveyors can be spaced, the shorter in length the sorter can still handle the same number of take-away conveyors. This both reduces sorter expense and the footprint of the equipment in the facility.

An article sortation system, according to an aspect of the invention, includes an article sorter having an article support surface moving in a longitudinal direction and a plurality of discharge conveyors extending from the article support surface. The sorter is adapted to discharge articles from the article support surface to said discharge conveyors. One or more of the discharge conveyors includes an active aligner having a driven surface that is adapted to reorient at least some of the diverted articles.

The one or more discharge conveyors may include a plurality of discharge conveyors, each including an active aligner. The driven surface may have a travel speed that exceeds a travel speed of the article support surface. The driven surface may vary in travel speed in response to variation in travel speed of the article support surface.

The driven surface may be made up of a plurality of generally parallel conveying lanes. At least one of the lanes has a high-friction conveying surface and at least one of the lanes has a low-friction conveying surface. The high-friction conveying surface has a coefficient of friction that is higher than a coefficient of friction of the low-friction conveying surface. The high-friction conveying surface may have a conveying speed that is greater than a conveying speed of the low-friction conveying surface. In this manner, articles are aligned on the high-friction surface. The low-friction conveying surface may include a series of generally parallel rollers that are skewed toward the high-friction conveying surface.

Another low-friction conveying surface may be provide that is adjacent the high-friction conveying surface on a side of the high-friction conveying surface that is opposite the low-friction conveying surface. The another low-friction conveying surface adapted to direct articles toward the high-friction conveying surface. The high-friction surface coefficient of friction is higher than a coefficient of friction of the another low-friction conveying surface. The high-friction conveying surface may have a conveying speed that is greater than a conveying speed of the another low-friction conveying surface. In this manner articles are aligned on the high-friction surface. The another low-friction conveying surface may include a series of generally parallel rollers that are skewed toward the high-friction conveying surface. The high-friction conveying surface may be defined by a belt conveyor.

A high-friction roller may be provided between the article support surface and the active aligner conveying surface. The article sorter may be a linear sorter or a carrousel sorter. The article sorter may be a linear sorter in the form of a positive displacement sorter. The positive displacement sorter may be a parallel divert sorter or a diagonal divert sorter. The discharge conveyors may extend in a generally lateral direction from the article support surface.

The active aligner may be substantially perpendicular to said longitudinal direction. A transition plate may be provided at an upstream interface between the article support surface and the active aligner conveying surface. The driven surface may be adapted to reorient at least certain diverted articles with a longer dimension and a shorter dimension to be oriented with shorter dimension leading. The driven surface may be adapted to align at least certain diverted articles along a region between lateral edges of the driven surface. The driven surface may be an article singulator.

An article sortation system, according to an aspect of the invention, includes an article sorter having an article support surface moving in a longitudinal direction and a plurality of discharge conveyors extending from the article support surface. The article sorter includes diverters that are adapted to initially displace an article on the article support surface without rotating that article then continue to displace that article to discharge that article from the article support surface to one of the discharge conveyors. At least one of the discharge conveyors includes a driven surface made up of plurality of generally parallel driven conveying lanes. At least one of the driven conveying lanes has a high-friction conveying surface and an adjacent one of the driven conveying lanes has a low-friction conveying surface. The high-friction conveying surface having a coefficient of friction that is higher than a coefficient of friction of the low-friction conveying surface.

The discharge conveyors may extend in a generally lateral direction perpendicular to the article support surface. The high-friction conveying surface may have a conveying speed that is greater than a conveying speed of the low-friction conveying surface. The driven surface may have a travel speed that exceeds a travel speed of the article support surface. The driven surface may vary in travel speed in response to variation in travel speed of the article support surface.

The at least one of the discharge conveyors may include a longitudinally oriented spitter roller at an interface between the article support surface and the driven conveying surface. The at least one of the discharge conveyors may include a transition plate upstream of the spitter roller. In this manner, a diverted article begins rotation by the spitter roller while the article is on the article support surface and transition plate and continues rotation by the driven conveying surface on the discharge conveyor. The article support surface may be defined by a plurality of laterally extending slats and the diverts are pusher shoes travelling along one or more the slats to selectively laterally divert an article travelling on the article support surface to one of the plurality of discharge conveyors. The discharge conveyors may extending in a generally lateral direction from the article support surface.

A method of sorting articles, according to an aspect of the invention, includes supporting articles with an article sorter having an article support surface moving in a longitudinal direction and discharging articles from the article support surface to a plurality of discharge conveyors extending from the article support surface. At least one of the discharge conveyors includes an active aligner made up of a driven surface including reorienting at least some of the diverted articles with the active aligner.

A method of sorting articles, according to an aspect of the invention, includes supporting articles with an article sorter having an article support surface moving in a longitudinal direction, and discharging articles to a plurality of discharge conveyors extending from the article support surface. The article is initially displaced on the article support surface by diverters without rotating that article then continued to be displaced to discharge article that from the article support surface to one of the discharge conveyors. At least one of the discharge conveyors includes a driven surface made up of a plurality of generally parallel driven conveying lanes. At least one of the driven conveying lanes has a high-friction conveying surface and at least one adjacent of the driven conveying lanes has a low-friction conveying surface. The high-friction conveying surface has a coefficient of friction that is higher than a coefficient of friction of the low-friction conveying surface.

The article sorting systems and methods set forth above may be used to sort articles at least some of which are flexible bags.

These and other objects, advantages and features of this invention will become apparent upon review of the following specification in conjunction with the drawings.

DETAILED DESCRIPTION OF THE PREFERRED EMBODIMENT

Figure 1:
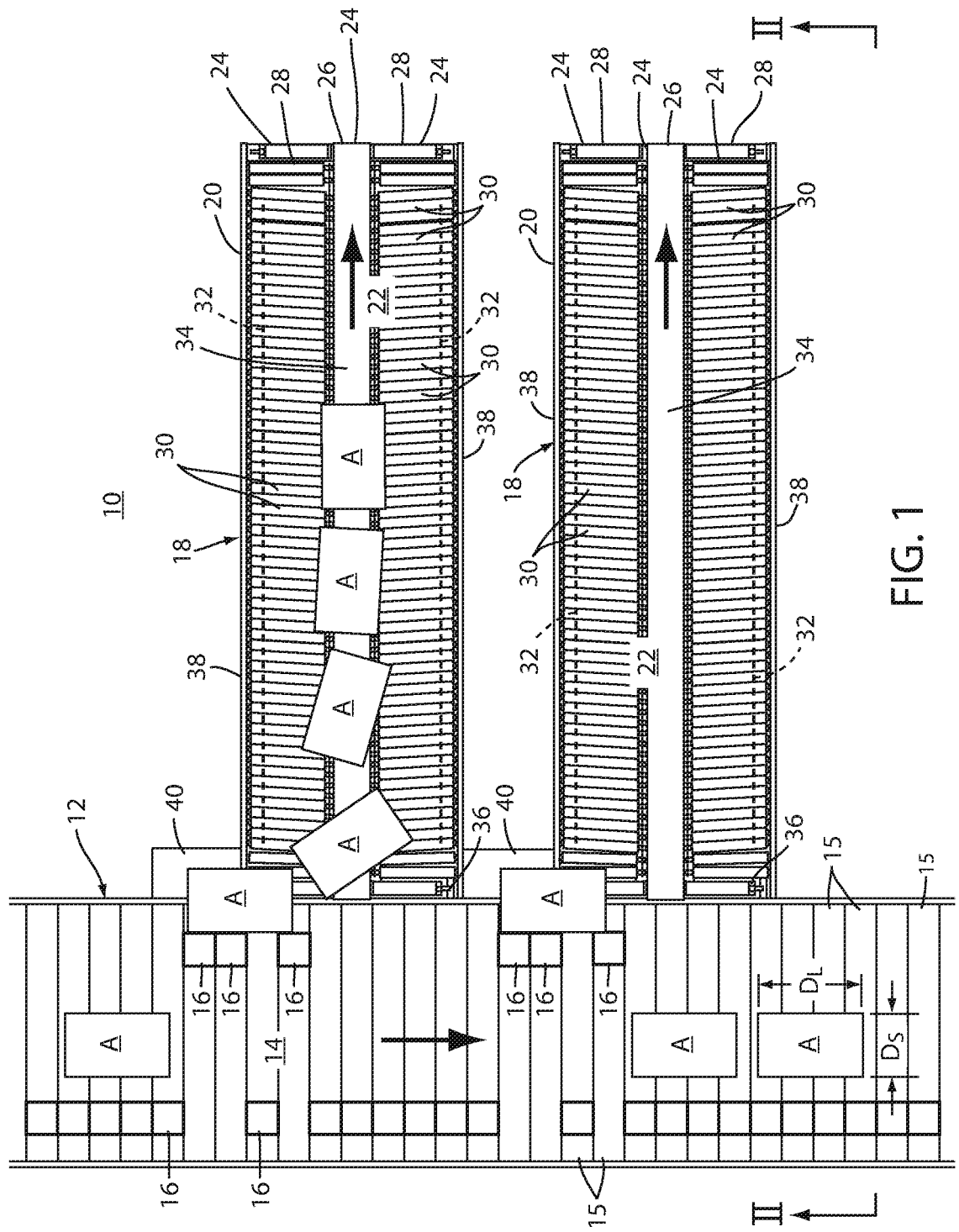
FIG. 1 is a top plan view of a sortation system and method of sorting articles according to an embodiment of the invention.
Figure 2:
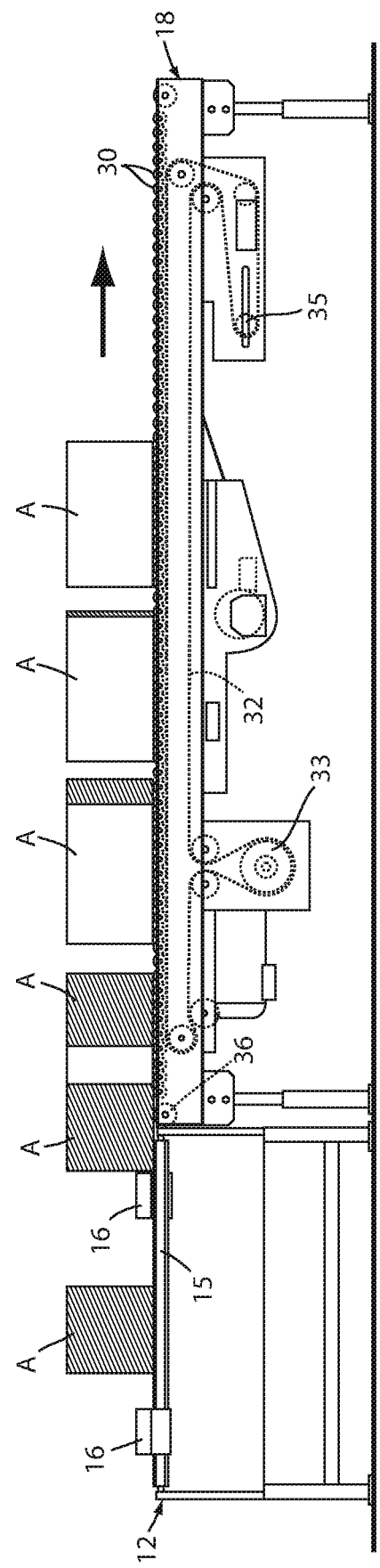
FIG. 2 is a sectional view taken along the lines II-II in FIG. 1.

Referring now to the drawing and the illustrative embodiments depicted therein, an article sortation system 10 includes an article sorter 12 and a plurality of discharge conveyors 18. Article sorter 12 receives a stream of articles A and discharges each article to a discharge conveyor 18 in order to sort the articles. While all of the articles A are illustrated as being of the same size, it should be understood that it is common to have articles of varying sizes and shapes. Some of articles A have a dimension $D_S$ that is shorter than a dimension $D_L$. Such articles may be referred to as elongated, long, or irregular, even if the shorter dimension $D_S$ is only slightly smaller than the long dimension $D_L$. Although only two discharge conveyors 18 are illustrated, it should be understood that it is common to have a much greater number of such discharge conveyors. Also, although discharge conveyors 18 are illustrated extending from only one side of article sorter 12, it is possible to have discharge conveyors 18 extending from both sides of article sorter 12 which would be referenced to as bi-lateral.

Article sorter 12 has an article support surface 14 moving in a longitudinal direction with discharge conveyors 18 extending in a generally lateral direction from the article support surface. The sorter is adapted to discharge articles A from article support surface 14 to one of the discharge conveyors 18. Article support surface 14 is defined by the upper surface of interconnected laterally extending slats 15. A return run of interconnected slats 15 is not shown. A plusher shoe 16 is mounted to each slat 15, although it may be connected between slats or to every other slat of the like. Such sorter is disclosed in more detail in commonly assigned U.S. Pat. No. 5,127,510; 6,866,136; or 8,820,520, the disclosures of which are hereby incorporated herein by reference in their entirety. In the illustrated embodiment, article sorter 12 diverts a plurality of pusher shoes 16 which travel in alignment along article support surface 14 which laterally diverts an article A without rotating the article. Such sorter is disclosed in the '136 and '520 patents and is referenced to as a parallel sorter. However, article sorter 12 could alternatively be a diagonal sorter of the type disclosed in the '510 patent which at least partially rotates the articles as the pusher shoes divert the article. The present invention will provide advantages when used with either a parallel or a diagonal divert sorter. Also, the invention finds use with other types of linear sorters, including but not limited to a pop-up vertical belt sorter disclosed in commonly assigned U.S. Pat. No. 8,469,178, right angle transfer disclosed in commonly assigned U.S. Pat. No. 7,383,936, steerable wheel diverter disclosed in U.S. Pat. No. 7,040,478, and crossbelt sortation system disclosed in U.S. Pat. No. 5,588,520, the disclosures of which are hereby incorporated herein by reference in their entirety.

Discharge conveyors 18 define an active aligner 20 having a driven surface 22. As will be explained in more detail below, active aligner 20 is adapted to orient an article A having a longer dimension $D_L$ and a shorter dimension $D_S$ with its shorter dimension $D_S$ leading. Also, active aligner 20 is adapted to align articles along a region, defined by a high friction conveying surface 26 between lateral edges 38 of driven surface 22. In the illustrated embodiment, driven surface 22 travels at a speed that exceeds a speed of the sorter article support surface 14. By way of example, in the illustrative embodiment, driven surface 22 is driven at a speed of 20 feet per minute (fpm) faster than the speed of article support surface 14. Other speed differences will be apparent to the skilled artisan. Also, if article support surface 14 varies in speed to accommodate load of articles supplied to sorter 12, as disclosed in commonly assigned U.S. Pat. No. 7,909,155, the disclosure of which is hereby incorporated herein by reference, driven surface 22 may vary in speed in response to the variation in speed of article support surface 14.

Driven surface 22 includes a plurality of generally parallel conveying lanes 24. One of the lanes 26 has a high-friction conveying surface such as defined by a belt conveyor 34. Lanes 28, on opposite sides of high friction conveying surface 26, have a low-friction conveying surface defined by driven rollers 30. High-friction conveying surface 26 has a coefficient of friction that is higher than a coefficient of friction of the low-friction conveying surfaces 28. In the illustrated embodiment, high-friction conveying surface 26 has a conveying speed that is greater than the conveying speeds of the low-friction conveying surfaces 28. For example, high-friction conveying surface is driven at 60 fpm greater than the speeds of low-friction conveying surfaces 28 which are driven 20 fpm faster than the speed of article support surface 14. The low-friction conveying surfaces 28 rollers 30 are arranged as a series of generally parallel rollers that are skewed toward the high-friction conveying surface 26. Thus, rollers direct articles A toward the high-friction surface 26. As the articles engage with high-friction conveying surface 26, their movement becomes controlled by movement of the high-friction conveying surface. Thus, the articles tend to align with the central region of driven surface 22 defined by high-friction conveying surface 26. Also, the articles tend to rotate into alignment with conveying surface 26 with their shorter dimension $D_S$ leading. Thus, the articles are aligned on driven surface 22 in a manner that allows the articles to be conveyed downstream of discharge conveyor 18 without becoming sideways which tends to jam the articles. Rollers 30 are driven by drive belts 32 which are located below the rollers. Drive belts 32 are driven by a motor with a suitable take-up 35 as is known in the art.

Thus, it is seen that active aligner 20 performs the function of an article singulator which is also known as an article unscrambler although only one article at a time is discharged to driven surface 22 rather than side-by-side articles as is typical with an article aligner or unscrambler. Also, since movement of articles is controlled by contact with the bottom surface of the article and the articles are aligned with the center of driven surface 22, active aligner 20 is capable of handling soft bags such as jiffy bags, polybags, and the like. However, other types of article unscrambler or singulator configuration may find use as discharge conveyor 18, even without all the benefits of active aligner 20. Also, active aligner may also find use in other applications where it is desired to singulate or unscramble bulk flow of articles such as feeding of articles to a gapper feeding the articles to article sorter 12.

A longitudinally oriented roller 36, which may be coated with a high-friction coating, known as a spitter roller, is provided at an interface between article support surface 14 and the driven conveying surface 22. Spitter roller 36 is a driven roller which may be driven by a separate motor or may be an internal motor driven roller. The central portion of roller 36, which may be uncoated, is used to driven belt conveyor 34. A transition plate 40 is provided adjacent article support surface 14 upstream of spitter roller 36 at an intersection of article sorter 12 and discharge conveyor 18. A diverted article begins rotation by spitter roller 36 while the article is on the article support surface 14 and transition plate 40 and continues rotation by the driven conveying surface 22 on discharge conveyor 18. If article sorter 12 is a diagonal sorter, transition plate 40 may not be provided since the article will already be diagonally oriented, and thus partially rotated, when it is diverted from the sorter article support surface 14.

Because of the ability of active aligner 20 to rotate and align articles diverted from article support surface 14, discharge conveyors 18 can be generally perpendicular to the movement of article support surface. This eliminates the need for bends in the discharge conveyor which take up room and also serve as a point where article jams can happen. As a result, the discharge conveyors can be spaced apart much less than previously known discharges. Because the spacing of discharges dictates the length of the article sorter, the present invention allows the same number of discharges to be provided in a shorter sorter length, saving both equipment expense and warehouse space. For example, in the illustrated embodiment, discharges can be spaced at 5 foot centers versus 10 foot centers in known discharges.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. An article sortation system, comprising:
    an article sorter having an article support surface moving in a longitudinal direction,
    a plurality of discharge conveyors extending from said article support surface, wherein said sorter comprises diverters that are adapted to initially displace an article on said article support surface without rotating that article then continue to displace that article to discharge that article from said article support surface to one of said discharge conveyors; and wherein at least one of said discharge conveyors comprises a driven surface made up of plurality of generally parallel driven conveying lanes, at least one of said driven conveying lanes having a high-friction conveying surface and an adjacent one of said driven conveying lanes having a low-friction conveying surface, wherein said high-friction conveying surface having a coefficient of friction that is higher than a coefficient of friction of said low-friction conveying surface.

2. The article sortation system as claimed in claim 1, wherein said discharge conveyors extending in a generally lateral direction perpendicular to said article support surface.

3. The sortation system as claimed in claim 1, wherein the high-friction conveying surface has a conveying speed that is greater than a conveying speed of said low-friction conveying surface.

4. The sortation system as claimed in claim 1, wherein said driven surface has a travel speed that exceeds a travel speed of said article support surface.

5. The sortation system as claimed in claim 1, wherein said driven surface varies in travel speed in response to variation in travel speed of the article support surface.

6. The sortation system as claimed in claim 1, wherein said at least one of said discharge conveyors comprising a longitudinally oriented spitter roller at an interface between the article support surface and the driven conveying surface.

7. The sortation system as claimed in claim 6, wherein said at least one of said discharge conveyors comprising a transition plate upstream the spitter roller in the longitudinal direction wherein a diverted article begins rotation by the spitter roller while the article is on the article support surface and said transition plate and continues rotation by the driven conveying surface on the discharge conveyor.

8. The sortation system as claimed in claim 1, wherein said article support surface defined by a plurality of laterally extending slats and said diverters comprise pusher shoes travelling along one or more said slats to selectively laterally divert an article travelling on said article support surface to one of said plurality of discharge conveyors.

9. A method of sorting articles, comprising:
supporting articles with an article sorter having an article support surface moving in a longitudinal direction,
discharging articles to a plurality of discharge conveyors extending from said article support surface, including initially displacing an article on said article support surface with a diverter without rotating that article then continuing to displace that article to discharge that article from said article support surface to one of said discharge conveyors; and
wherein at least one of said discharge conveyors comprises a driven surface made up of plurality of generally parallel driven conveying lanes, at least one of said driven conveying lanes having a high-friction conveying surface and at least one of said driven conveying lanes adjacent to said high-friction conveying surface having a low-friction conveying surface, wherein said high-friction conveying surface having a coefficient of friction that is higher than a coefficient of friction of said low-friction conveying surface.

10. The method as claimed in claim 9 used to sort articles at least some of which are flexible bags.

* * * * *